Dec. 11, 1951    M. BENEDICT ET AL    2,577,730
IRON OXIDE REDUCTION
Filed June 24, 1949
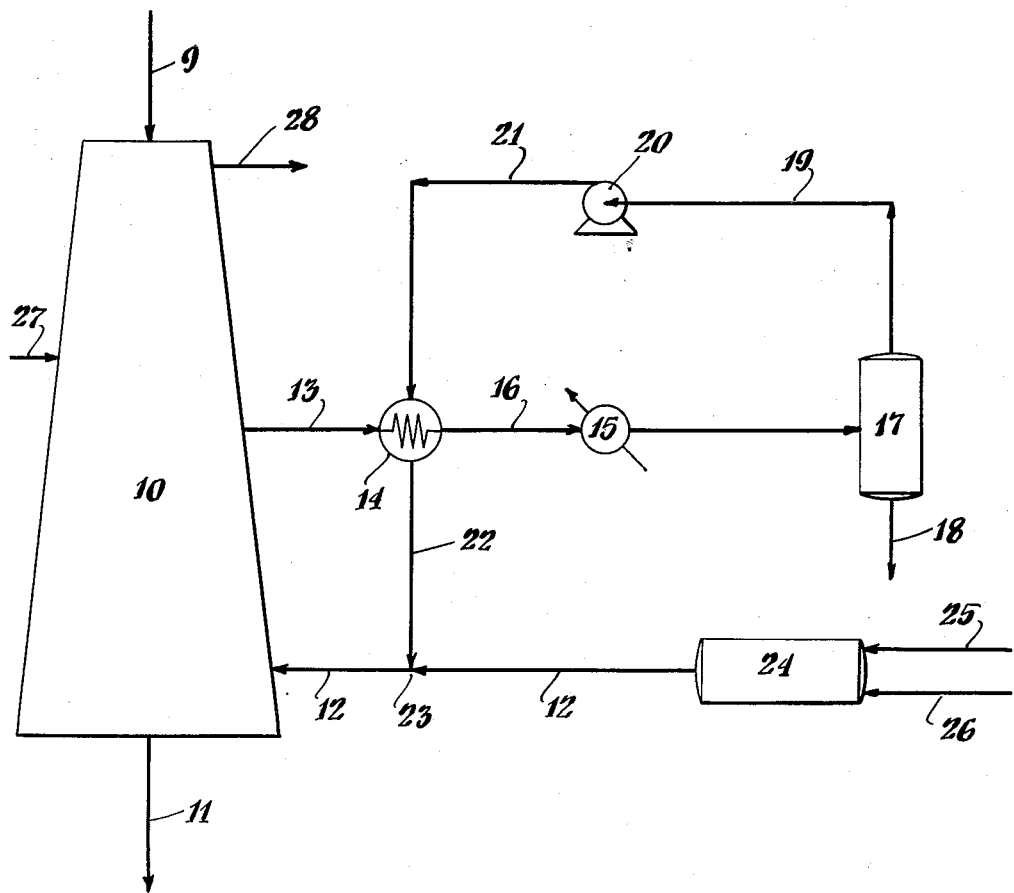
INVENTORS.
MANSON BENEDICT
JAMES B. WAGSTAFF
GEORGE B. WEBB
By Paul W. Garbo
AGENT

UNITED STATES PATENT OFFICE 2,577,730

IRON OXIDE REDUCTION

Manson Benedict, Westfield, James B. Wagstaff, Ridgewood, and George B. Webb, Westfield, N. J., assignors to Hydrocarbon Research, Inc., New York, N. Y., a corporation of New Jersey Application June 24, 1949, Serial No. 101,048

12 Claims. (Cl. 75—34)

This invention relates to improvements in the reduction of iron oxide and more particularly to a process for the efficient utilization of reducing gas in the operation of a shaft-type reducing furnace.

In shaft-type furnaces, such as the Wiberg furnace, where it is desirous to reduce iron ore to sponge iron with a reducing gas comprising essentially carbon monoxide and hydrogen, the furnace temperature must be kept within a narrow range, i. e., high enough to permit ore reduction to proceed at a tolerable rate and low enough to prevent melting and/or sintering of the iron which would hinder the further reduction of ore. In the process currently in industrial use, the desired temperature control is maintained by having the molar ratio of carbon monoxide to hydrogen of the reducing gas fed to the reduction zone in the range of about 3.0 to about 5.0. Such control is effected by compensating the endothermic reaction of hydrogen with the exothermic reaction of carbon monoxide, illustrated thus:

(A) $FeO + CO - 3310$ calories/mol $\rightarrow Fe + CO_2$
(B) $FeO + H_2 + 6460$ calories/mol $\rightarrow Fe + H_2O$ The selected ratio of carbon monoxide to hydrogen also depends on the heat leak from the reduction zone which in turn depends on the size and productive capacity of the furnace. For example, a small furnace with a relatively high heat loss may require a reducing gas with a ratio of carbon monoxide to hydrogen as high as 5 to 1; a large furnace with a relatively low heat loss may utilize a reducing gas with a lower ratio of carbon monoxide to hydrogen around 3 to 1.

In many localities, fuels of high carbon content are expensive and the reduction of iron oxide could be attained more economically from the utilization of fuels with a relatively low ratio of carbon to hydrogen. However, the partial combustion of such a fuel, i. e., a fuel or combination of fuels in which the weight ratio of carbon to hydrogen is less than 15, normally results in a reducing gas with a ratio of carbon monoxide to hydrogen less than 2.5, which is too low for satisfactory reduction of iron oxide in the process now used commercially. For example, the partial oxidation of methane to yield carbon monoxide and hydrogen results in a gas with a ratio of carbon monoxide to hydrogen of about 0.5

Recent proposals to increase the ratio of carbon monoxide to hydrogen of reducing gas produced from the partial combustion of fuels of low carbon to hydrogen ratio include adding to the fuel undergoing conversion carbon dioxide obtained by scrubbing carbon dioxide out of the gases leaving the iron oxide reduction furnace or by calcining carbonates such as limestone or dolomite. The recovery of carbon dioxide by scrubbing with an absorptive liquid is a relatively expensive operation which augments materially the cost of iron ore reduction. The calcination of limestone, dolomite or the like has the disadvantage of requiring a supply of the carbonate as well as a way for disposing of the calcination by-products, i. e., lime, magnesia or the like; this expedient is also costly.

It is a primary object of this invention to provide a simple and improved process for operating an iron ore reduction furnace with a reducing gas produced from a hydrocarbonaceous fuel.

Another important object is to control the temperature in the reduction zone by regulating the ratio of carbon monoxide to hydrogen of the reducing gas and to effect such regulations of the gas composition in an economic manner.

Still another object is to operate an iron ore reduction furnace with a reducing gas having a relatively low ratio of carbon monoxide to hydrogen and still control the temperature within the narrow range necessary for practical reduction.

Other objects and advantages of this invention will become apparent from the description which follows.

In accordance with this invention, iron oxide is reduced within a shaft-type furnace by reducing gas comprising essentially carbon monoxide and hydrogen and containing minor proportions of carbon dioxide and water vapor, the reducing gas being prepared by partial combustion or oxidation of a hydrocarbonaceous fuel in which the weight ratio of carbon to hydrogen is less than 15 with concentrated oxygen of at least about 50% by volume purity, preferably at least about 90% by volume purity, and by reacting the gaseous products of partial oxidation with a stream of the same reducing gas after it has passed through at least part of the furnace and water vapor has been removed from the stream so that the resulting reducing gas has a higher ratio of carbon monoxide to hydrogen than the reducing gas prepared by the partial combustion of the hydrocarbonaceous fuel.

More specifically, the reducing gas employed in the process of this invention is first produced by the partial combustion of a hydrocarbonaceous fuel like natural gas, petroleum hydrocarbons, tars and coals of high volatile content with concentrated oxygen; the gas so produced contains carbon monoxide and hydrogen in the ratio of about 0.5 to 2.5 mols of carbon monoxide per mol of hydrogen, and minor proportions of carbon dioxide and water vapor. The ratio of carbon monoxide to hydrogen of this gas is then increased to the desired value in the ratio range of about 1.2 to 4.0 by reacting the gas at an elevated temperature, usually above 1700° F., with at least partially reacted reducing gas withdrawn from the reducing furnace and treated to remove therefrom the major portion, preferably at least about 70%, of the water content. Since the withdrawn reducing gas has reacted with the iron oxide in the furnace as illustrated by Equations A and B, hereinbefore set forth, it is clear that its content of carbon monoxide and hydrogen has decreased and its content of carbon dioxide and water vapor has increased. The gas drawn from the reducing furnace for the purpose of reacting with and modifying the fresh gas produced by the partial combustion of the hydrocarbonaceous fuel preferably has only about 60% to 90% of the content of carbon monoxide and hydrogen present in the reducing gas charged into the furnace. In other words, the gaseous stream which is used to modify the fresh gas derived from the hydrocarbonaceous fuel is withdrawn from the iron ore reduction zone at a point where preferably about 10% to 40% of the content of carbon monoxide and hydrogen of the reducing gas charged thereinto has been converted to carbon dioxide and water vapor. By removing the major portion of the water vapor from this stream and admixing the stream with the fresh gas at an elevated temperature, the molar ratio of carbon monoxide to hydrogen of the fresh gas is increased because the water-gas shift reaction is favored toward the right, thus:

(C) $\quad H_2 + CO_2 \rightarrow H_2O + CO$

In the preferred form of the invention where the gaseous stream withdrawn from the reducing furnace has about 60% to 90% of the content of carbon monoxide and hydrogen present in the reducing gas which is supplied to the furnace, between about 2 and 4 volumes of this gaseous stream are admixed, after eliminating water vapor therefrom, with each volume of fresh gas derived from the hydrocarbonaceous fuel to form the reducing gas which flows into the reducing furnace.

As indicated hereinabove, a preferred embodiment of the invention involves the recirculation of about 2 to 4 volumes of partially reacted gas drawn from an intermediate level of the reduction furnace and the blending of this gas with each volume of fresh gas derived from the partial oxidation of the hydrocarbonaceous fuel. The blending is carried out at an elevated temperature so that the molar ratio of carbon monoxide to hydrogen of the fresh gas is increased through the water-gas shift reaction of the carbon dioxide in the recycled gas. The resulting reducing gas is at an elevated temperature so that some of its sensible heat is available for the reduction of the iron ore. Because of the large volume of recycle gas which is heated to an elevated temperature for reaction with the fresh gas, the present invention makes it possible to supply heat to the reduction zone in the form of sensible heat in the reducing gas flowing therethrough; this introduction of heat diminishes the requirement of exothermically reactive carbon monoxide so that the reduction of iron ore can now be effected with a reducing gas having a molar ratio of carbon monoxide to hydrogen in the range of about 1.2 to 4.0 in contrast to a range of about 3.0 to 5.0 required in prior reduction processes. In a shaft-type furnace the reducing gas ascends through the downwardly moving bed of iron ore so that the gas becomes progressively cooler while the moving solids become progressively hotter. In general, the gas for recirculation is drawn from the furnace at a level where the gas temperature is at least about 50° F. lower than the temperature of the reducing gas entering the bottom of the furnace; it is not advisable to withdraw the recycle gas from a level in the furnace where the initial temperature of the reducing gas charged into the bottom of the furnace has dropped more than 250° F.

As already indicated, a predominant proportion of the gas rising through the reduction furnace is withdrawn at an intermediate level for recycling with added fresh gas to the bottom of the furnace. The remaining minor proportion of the gas continues to ascend through the furnace and thus partially reduces the descending iron oxide and imparts preheat thereto. In the upper portion of the furnace above the point where recycle gas is withdrawn, air may be introduced to burn the hydrogen and carbon monoxide remaining in the ascending gas stream; in this way, these gaseous reactants are utilized more fully and further preheating of the iron oxide is effected.

Supplying heat to the reduction furnace in the form of sensible heat in the fresh gas derived from the partial oxidation of the hydrocarbonaceous fuel, in accordance with this invention, is more economical than prior methods of supplying heat and eliminates the need for any extraneous heating means. By increasing the ratio of recycle gas to fresh gas to the maximum permissible to satisfy all other conditions, as hereinbefore discussed, further economies are realized as less hydrocarbonaceous fuel and, therefore, less oxygen are needed to produce the fresh gas.

For convenience, further description of the invention will be in terms of methane or natural gas as the hydrocarbonaceous fuel. However, it will be understood that the invention is not limited to this illustrative fuel.

For a clearer and more detailed understanding of the invention, reference is now made to the drawing forming a part of this specification and showing a diagrammatic flowsheet of one embodiment of the invention.

Iron oxide is introduced into the top 9 of shaft-type furnace 10 and gradually descends through the furnace while undergoing reduction until sponge iron is withdrawn from the lower portion through line 11. The gaseous reducing stream consisting principally of carbon monoxide and hydrogen and containing lesser proportions of carbon dioxide and water vapor is fed at an elevated temperature into the lower portion of furnace 10 through line 12 and the stream passes in countercurrent relation to the descending iron oxide. In order to attain a desirably high rate of reduction without causing sintering of the reduced iron, the maximum furnace temperature is rarely made to exceed 2000° F. and frequently falls within the range of about 1750° to 1900° F.

When a steady state of reduction is attained, a predominant portion of the partially reacted reducing gaseous stream is withdrawn from the furnace at an intermediate point through line 13. The point of this withdrawal is chosen on the basis that the ascending gaseous stream has developed a relatively high content of water and carbon dioxide. As previously expressed in another way, the recycle gas is drawn from the furnace at a level where the gaseous stream rising through the furnace no longer gives a reasonable rate of reduction of the descending iron oxide. The withdrawn or recycle gas, still at an elevated temperature, is cooled in heat exchanger 14 and is then passed through water-cooled condenser 15 in line 16 to condense a major portion, preferably at least about 70%, of the water vapor in the recycle stream. The cooled stream thence passes to separator 17 where the condensed water is removed and discarded through line 18. The relatively dry, cold recycle stream flows through line 19 to blower 20 which forces the stream through conduit 21 into heat exchanger 14. The recycle stream is thus reheated and passes through line 22, discharging into line 12 at 23. At the juncture 23, the recycle stream is combined with fresh, make-up, hot reducing gas having a relatively low ratio of carbon monoxide to hydrogen. The make-up or fresh reducing gas is prepared in generator 24 by the partial oxidation of methane. Oxygen of at least about 50% by volume purity, preferably at least about 90% by volume purity, is supplied to generator 24 by line 25; preferably, the oxygen is supplied at a preheat temperature approaching about 600° F. The methane, also preferably preheated to a temperature approaching about 1000° F., is charged into generator 24 through line 26. The partial oxidation of methane to produce carbon monoxide and hydrogen is conducted in generator 24 at a temperature in the range of about 2000° to 3000° F. The hot make-up gas discharges into line 12 and commingles at juncture 23 with the recycle gas flowing from line 22. Since the two gas streams become mixed at an elevated temperature, usually above 1700° F., the carbon dioxide in the recycle gas reacts with the hydrogen which is in excess in the make-up gas, the ratio of carbon monoxide to hydrogen being only about 0.5 in the make-up gas, so that in accordance with Equation C, hereinbefore given, carbon monoxide is formed at the expense of hydrogen and thus the molar ratio of carbon monoxide to hydrogen of the combined gaseous stream is adjusted to the desired value in the range of about 1.2 to 4.0. If desired, a drum or vessel may be used at the juncture 23 for mixing and reacting the recycle and make-up gases. As already mentioned, the combined gaseous reducing stream flows through line 12 into the lower end of furnace 10 and then passes upwardly therethrough to reduce iron oxide to metallic iron.

The minor portion of the gases rising through furnace 10, which is not withdrawn through line 13, continues its upward flow through the upper portion of the furnace. Generally, between the outlet connecting with line 13 and the inlet connecting with line 27, some reduction of higher oxides of iron to ferrous oxide takes place. The rising gases then meet a blast of air introduced through line 27. The resulting combustion of the unreacted carbon monoxide and hydrogen in the ascending furnace gases furnishes preheat to the iron oxide charged into the furnace by line 9. The flue gases after flowing in countercurrent contact with the descending iron oxide are discharged from furnace 10 through line 28. The advantages of the present invention are more fully appreciated from an examination of the following specific example.

For the production of about 300 tons per day of sponge iron, iron ore is fed into the top of shaft-type furnace 10 at a rate to supply about 224 lb. mols of ferric oxide per hour. The reducing gas entering furnace 10 by way of line 12 is at a temperature of about 1830° F. and provides an hourly feed of 1273 lb. mols of carbon monoxide, 234 lb. mols of carbon dioxide, 889 lb. mols of hydrogen and 281 lb. mols of water vapor.

Air is supplied to furnace 10 by way of line 27 at a rate to furnish hourly 38.5 lb. mols of oxygen for the purpose of preheating the iron oxide by combustion of unreacted carbon monoxide and hydrogen rising through the upper portion of furnace 10. The combustion or flue gases leave the top of furnace 10 by way of line 28 at a temperature of about 300° F.

The recycle gas is drawn off through line 13 at a level in the furnace where the temperature is about 1750° F. and the composition of the gas is such that the rate of reduction of the iron oxide has declined considerably. The recycle stream effects the hourly withdrawal from furnace 10 of 886 lb. mols of carbon monoxide, 375 lb. mols of carbon dioxide, 593 lb. mols of hydrogen and 387 lb. mols of water vapor. The recycle gas is cooled in heat exchanger 14 and further cooled in condenser 15 where hourly about 302 lb. mols (nearly 80%) of the water vapor is condensed and then eliminated at separator 17. This relatively dry recycle gas now containing only about 20% of the water vapor originally present in the gas withdrawn from furnace 10 is made to flow by blower 20 through heat exchanger 14 and into line 12.

Make-up reducing gas is produced in generator 24 by supplying hourly thereto 246 lb. mols of methane at a temperature of about 950° F. and 150 lb. mols of oxygen at a temperature of about 600° F. The make-up gas discharges from generator 24 into line 12 at a temperature of about 2700° F., furnishing hourly 237 lb. mols of carbon monoxide, 9 lb. mols of carbon dioxide, 446 lb. mols of hydrogen and 46 lb. mols of water vapor.

At the juncture 23, the recycle and make-up gases meet and react to form the aforementioned reducing gas which enters the bottom of furnace 10 at a temperature of about 1830° F.

The sponge iron product leaving the furnace through line 11 effects the hourly withdrawal of 394 lb. mols of metallic iron and 54 lb. mols of ferrous oxide.

It is evident in the foregoing example that while the make-up gas derived from the partial oxidation of methane has a molar ratio of carbon monoxide to hydrogen of about 0.5, the reducing gas entering furnace 10 by way of line 12 has a corresponding ratio of about 1.4. About 84% of the gas entering through line 12 is withdrawn from the furnace by line 13 for the recycle stream. At the level of withdrawal, about 17.5% of the carbon monoxide and 19% of the hydrogen charged into the bottom of furnace 10 has reacted with the descending iron oxide. It will also be observed that about 3 volumes of recycle gas are withdrawn from furnace 10 by line 13 for each volume of make-up gas furnished by generator 24.

To recapitulate, by recycling a major portion of the reducing gases rising through a shaft-type furnace after an appreciable water content has developed therein and by eliminating the major portion of the water in the recycle stream, the present invention provides a doubly attractive and economic process for the reduction of iron oxide in that the consumption of fuel is kept low and the process is operated entirely with a relatively cheap hydrocarbonaceous fuel.

Since certain changes may be made in carrying out the process hereinabove described without departing from the scope and spirit of the invention, it is intended that all matter contained herein shall be interpreted as illustrative and not in a limiting sense.

What is claimed is:

1. In the reduction of iron oxide in a shaft-type furnace wherein the iron oxide descends in contact with a countercurrent reducing gaseous stream comprising carbon monoxide and hydrogen, the improvement which comprises withdrawing from said furnace a portion of said reducing stream after a part of said carbon monoxide and hydrogen have been converted, respectively, to carbon dioxide and water vapor by reaction with said iron oxide, treating the withdrawn stream to physically eliminate a major portion of the water vapor therein, preparing a fresh reducing gaseous stream comprising carbon monoxide and hydrogen in a molar ratio of carbon monoxide to hydrogen in the range of about 0.5 to 2.5, combining the treated withdrawn stream and said fresh stream at an elevated temperature to effect the water-gas shift reaction and thus increase the molar ratio of carbon monoxide to hydrogen of the combined streams to a value in the range of about 1.2 to 4.0, and supplying said combined streams to said furnace as said reducing stream.

2. The process of claim 1 wherein the withdrawn stream has a volume about 2 to 4 times the volume of the fresh reducing gaseous stream.

3. The process of claim 1 wherein the treatment of the withdrawn stream eliminates at least about 70% of the water vapor therein.

4. The process of claim 1 wherein the withdrawn stream has only about 60% to 90% of the content of carbon monoxide and hydrogen in the combined streams supplied to said furnace.

5. The process of claim 1 wherein the withdrawn stream has a temperature about 50° to 250° F. lower than the temperature of the combined streams supplied to said furnace.

6. The production of sponge iron by the reduction of iron oxide in a shaft-type furnace, which comprises passing iron oxide from the top to the bottom of said furnace while passing from the bottom to the top of said furnace a reducing gaseous stream comprising carbon monoxide and hydrogen, withdrawing a major portion of said reducing stream from an intermediate level of said furnace where part of said carbon monoxide and hydrogen have been converted, respectively, to carbon dioxide and water vapor by reaction with said iron oxide, treating the withdrawn stream to physically eliminate a major portion of the water vapor therein, preparing a fresh reducing gaseous stream comprising carbon monoxide and hydrogen by the partial combustion of a hydrocarbonaceous fuel having a weight ratio of carbon to hydrogen of less than 15 with concentrated oxygen of at least about 50% by volume purity, combining the treated withdrawn stream and said fresh stream at a temperature above about 1700° F. whereby the combined streams attain a molar ratio of carbon monoxide to hydrogen in the range of about 1.2 to 4.0, supplying said combined streams to the bottom of said furnace as said reducing stream, and discharging the resultant sponge iron from the bottom of said furnace.

7. The process of claim 6 wherein the hydrocarbonaceous fuel is derived from petroleum.

8. The process of claim 6 wherein the hydrocarbonaceous fuel is natural gas.

9. The process of claim 8 wherein the concentrated oxygen is of at least about 90% by volume purity.

10. The process of claim 6 wherein the withdrawn stream has a volume about 2 to 4 times the volume of the fresh reducing gaseous stream.

11. The process of claim 6 wherein the withdrawn stream has only about 60% to 90% of the content of carbon monoxide and hydrogen in the combined streams supplied to the bottom of said furnace.

12. The process of claim 6 wherein the temperature of the intermediate level of said furnace whence the major portion of said reducing stream is withdrawn is at least about 50° F. below the temperature at the bottom of said furnace.

MANSON BENEDICT.
JAMES B. WAGSTAFF.
GEORGE B. WEBB.

REFERENCES CITED

The following references are of record in the file of this patent:

UNITED STATES PATENTS

| Number | Name | Date |
|---|---|---|
| 812,247 | Westman | Feb. 13, 1906 |
| 1,256,623 | Westberge et al. | Feb. 19, 1918 |
| 1,401,222 | Wiberg | Dec. 27, 1921 |
| 1,433,854 | Sinding-Larsen | Oct. 31, 1922 |
| 2,048,112 | Gahl | July 21, 1936 |
| 2,182,009 | Wiberg | Dec. 5, 1939 |
| 2,198,560 | Marshall, Jr. | Apr. 23, 1940 |

OTHER REFERENCES

The Iron Age, vol. 153, January 20, 1944, pages 55 to 59, and 150, and January 27, 1944, pages 56 to 65. Published by The Chilton Co., Inc., Philadelphia, Pa.

Canadian Mining and Metallurgical Bulletin, July 1948, page 403. Published by The Canadian Institute of Mining and Metallurgy, Montreal, Canada.